(12) United States Patent
Stone et al.

(10) Patent No.: US 9,287,984 B2
(45) Date of Patent: Mar. 15, 2016

(54) TUNABLE BI-DIRECTIONAL TRANSCEIVER

(71) Applicant: SKORPIOS TECHNOLOGIES, INC., Albuquerque, NM (US)

(72) Inventors: Robert J. Stone, Berkeley, CA (US); Amit Mizrahi, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 309 days.

(21) Appl. No.: 13/722,132

(22) Filed: Dec. 20, 2012

(65) Prior Publication Data

US 2013/0183044 A1      Jul. 18, 2013

Related U.S. Application Data

(60) Provisional application No. 61/578,838, filed on Dec. 21, 2011.

(51) Int. Cl.
*H04B 10/40* (2013.01)

(52) U.S. Cl.
CPC ...................... *H04B 10/40* (2013.01)

(58) Field of Classification Search
USPC .............................. 398/41–42, 135
See application file for complete search history.

(56) References Cited

U.S. PATENT DOCUMENTS

| | | | |
|---|---|---|---|
| 5,077,816 A | 12/1991 | Glomb et al. | |
| 6,546,160 B1 * | 4/2003 | Schunk | 385/14 |
| 2003/0198470 A1 * | 10/2003 | Lauder et al. | 398/42 |
| 2004/0105611 A1 | 6/2004 | Bischel et al. | |
| 2007/0154221 A1 | 7/2007 | McNicol et al. | |
| 2007/0167815 A1 * | 7/2007 | Jacobsen et al. | 600/459 |

(Continued)

FOREIGN PATENT DOCUMENTS

| | | | |
|---|---|---|---|
| WO | WO 2010/140186 A1 * | 12/2010 | G02B 6/42 |
| WO | WO 2013/096688 A1 | 6/2013 | |

OTHER PUBLICATIONS

International Preliminary Report on Patentability of PCT/US2012/071075 mailed on Jul. 3, 2014, 8 pages.

(Continued)

*Primary Examiner* — Shi K Li
(74) *Attorney, Agent, or Firm* — Kilpatrick Townsend & Stockton LLP

(57) ABSTRACT

A transceiver includes an optical waveguide and a first filter optically coupled to the optical waveguide and operable to filter a first optical signal in a first wavelength band propagating downstream. A center wavelength of the first wavelength band is tunable. The transceiver also includes a first receiver optically coupled to the first filter and a second filter optically coupled to the optical waveguide and operable to filter a second optical signal in a second wavelength band propagating downstream. The second wavelength band is different from the first wavelength band. The transceiver further includes a second receiver optically coupled to the second filter to receive the second optical signal and a laser optically coupled to the optical waveguide and operable to output radiation in a third wavelength band propagating upstream. The third wavelength band is different from both the first wavelength band and the second wavelength band.

16 Claims, 3 Drawing Sheets

(56) References Cited

U.S. PATENT DOCUMENTS

| | | | |
|---|---|---|---|
| 2007/0280695 A1* | 12/2007 | Li et al. | 398/135 |
| 2008/0240725 A1* | 10/2008 | Yokoyama | 398/139 |
| 2009/0010648 A1* | 1/2009 | Zuhdi | 398/58 |
| 2010/0054751 A1* | 3/2010 | Murry et al. | 398/137 |
| 2010/0209038 A1* | 8/2010 | Popovic et al. | 385/1 |
| 2011/0135251 A1 | 6/2011 | Kato | |
| 2011/0311229 A1* | 12/2011 | Kondo et al. | 398/79 |

OTHER PUBLICATIONS

Notification of Transmittal of the International Search Report and the Written Opinion of the International Searching Authority, or the Declaration; International Search Report and Written Opinion of the International Searching Authority for corresponding International application No. PCT/US2012/071075 mailed on Mar. 7, 2013, 8 pages.

* cited by examiner

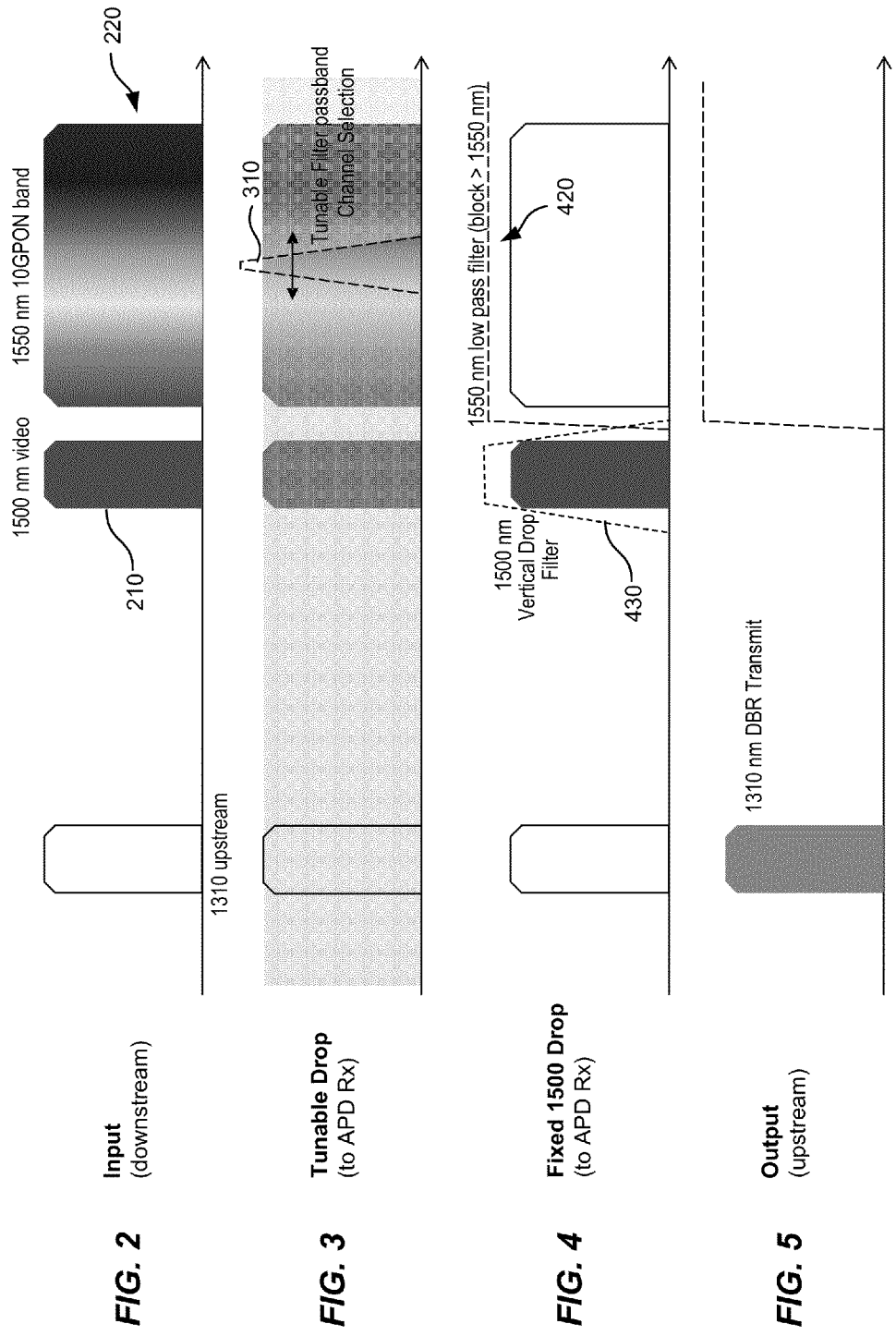

TUNABLE BI-DIRECTIONAL TRANSCEIVER

CROSS-REFERENCES TO RELATED APPLICATIONS

This application claims priority to U.S. Provisional Patent Application No. 61/578,838, filed on Dec. 21, 2011, entitled "Tunable Bi-Directional Transceiver," the disclosure of which is hereby incorporated by reference in its entirety for all purposes.

BACKGROUND OF THE INVENTION

A transceiver is a device including both a transmitter and a receiver that are combined in a single package and share common circuitry. Conventional optical transceivers operate on a single wavelength for both transmit and receive channels. Despite the use of optical transceivers in some applications, there is a need in the art for improved methods and systems related to bi-directional optical transceivers.

SUMMARY OF THE INVENTION

Embodiments of the present invention relate to optical communications systems. More particularly, embodiments of the present invention relate to tunable bi-directional transceivers. As an example, some embodiments of the present invention relate to the integration of filters, detectors, and a laser using a Template Assisted Bonding process. Tunability of one or more of the filters is provided, enabling implementation in a variety of optical communications applications.

According to an embodiment of the present invention, a tunable bi-directional transceiver is provided. The tunable bi-directional transceiver includes an optical waveguide and a first filter optically coupled to the optical waveguide and operable to filter a first optical signal in a first wavelength band propagating downstream in the optical waveguide. A center wavelength of the first wavelength band is tunable. The tunable bi-directional transceiver also includes a first receiver optically coupled to the first filter to receive the first optical signal and a second filter optically coupled to the optical waveguide and operable to filter a second optical signal in a second wavelength band propagating downstream in the optical waveguide. The second wavelength band is different from the first wavelength band. The tunable bi-directional transceiver further includes a second receiver optically coupled to the second filter to receive the second optical signal and a laser optically coupled to the optical waveguide and operable to output radiation in a third wavelength band propagating upstream in the optical waveguide. The third wavelength band is different from both the first wavelength band and the second wavelength band.

According to another embodiment of the present invention, a method of operating a transceiver is provided. The method includes receiving a downstream data stream comprising a first signal in a first wavelength band and a second signal in a second wavelength band and filtering the downstream data stream using a first tunable filter to select a predetermined channel. The method also includes detecting the predetermined channel and filtering the downstream data using a second filter to select a second channel. The method further includes detecting the second channel, generating an upstream data stream, and transmitting the upstream data stream to a network.

According to another embodiment of the present invention, a tunable optical network architecture includes an optical waveguide and a first filter optically coupled to the optical waveguide and operable to filter a first optical signal in a first wavelength range propagating downstream in the optical waveguide. The first wavelength range is tunable. The tunable optical network architecture also includes a first receiver optically coupled to the first filter to receive the first optical signal and a second filter optically coupled to the optical waveguide and operable to filter a second optical signal in a second wavelength range propagating downstream in the optical waveguide. The second wavelength range is different from the first wavelength range. The tunable optical network architecture further includes a second receiver optically coupled to the second filter to receive the second optical signal and a laser optically coupled to the optical waveguide and operable to output radiation in a third wavelength range to be propagated upstream in the optical waveguide. The third wavelength range is different from both the first and second wavelength ranges.

Numerous benefits are achieved by way of the present invention over conventional techniques. For example, embodiments of the present invention provide opportunities for remote reconfiguration of a network or inventory reduction by manufacturing a single tunable part rather than multiple fixed wavelength parts. These and other embodiments of the invention along with many of its advantages and features are described in more detail in conjunction with the text below and attached figures.

BRIEF DESCRIPTION OF THE DRAWINGS

FIG. 2 is a simplified spectral diagram illustrating input wavelength bands according to an embodiment of the present invention;

FIG. 3 is a simplified spectral diagram illustrating filtering of tunable receiver wavelength bands according to an embodiment of the present invention;

FIG. 4 is a simplified spectral diagram illustrating filtering of fixed receiver wavelength bands according to an embodiment of the present invention;

FIG. 5 is a simplified spectral diagram illustrating output wavelength bands according to an embodiment of the present invention.

DETAILED DESCRIPTION OF THE INVENTION

Embodiments of the present invention relate to optical communications systems. More particularly, embodiments of the present invention relate to tunable bi-directional transceivers. As an example, some embodiments of the present invention relate to the integration of filters, detectors, and a laser using a Template Assisted Bonding process. Tunability of one or more of the filters is provided, enabling implementation in a variety of optical communications applications.

Embodiments of the present invention relate to an optical communication system and an optical network architecture and unit. Embodiments of the present invention include a tunable channel optical receiver, a fixed channel optical receiver, and a fixed channel optical transmitter. Combined, these elements form a tunable bi-directional transceiver. Embodiments of the present invention have a number of applications including use as a component of a passive optical network (PON) such used in fiber to the home, premise, or business (FTTx), which typically utilize multiple separate optical channels. In currently deployed technologies, the "transmit" and "receive" channels are at pre-determined fixed optical wavelengths. Embodiments described herein are applicable to next generation architectures that utilize a tunable design in which multiple optical channels may exist for both transmit and receive purposes. The user then selects the desired optical channel by tuning the receiver to the correct optical channel. This is advantageous, as it enables a network with more channels, and therefore more bandwidth, serving more users at higher data rates. It should be noted that in some embodiments described herein, only the receiver is tunable, however, other embodiments utilize a tunable transmitter and a design in which the upstream optical architecture is compatible.

Figure 1:
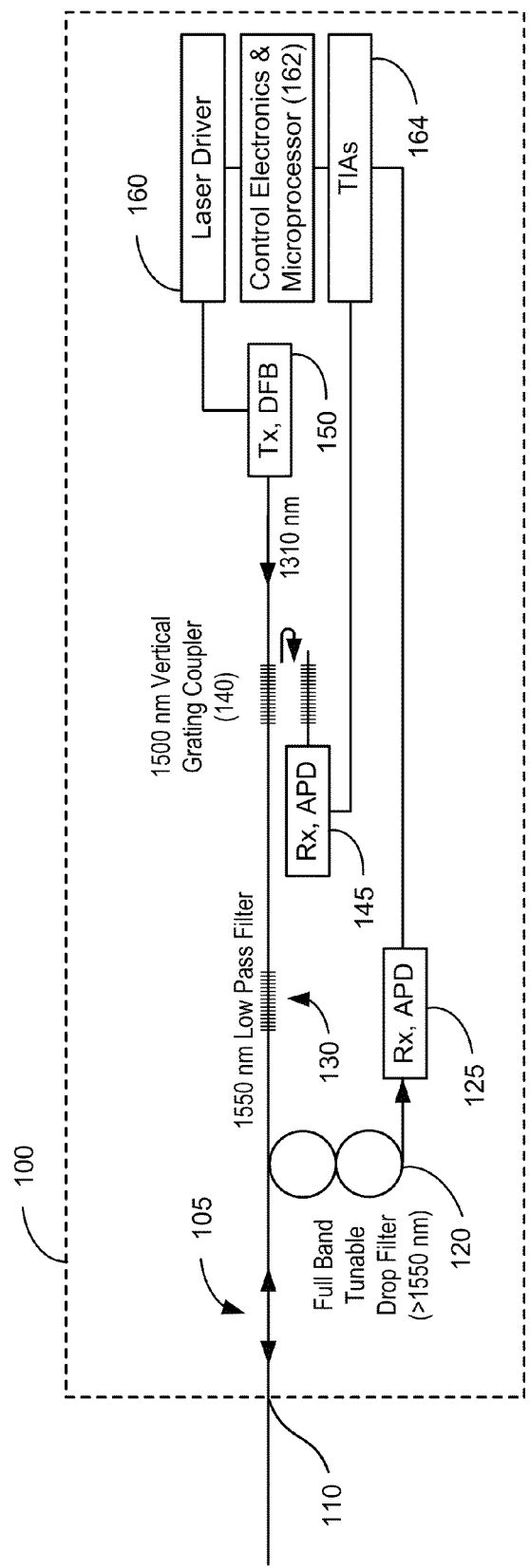
FIG. 1 is a simplified schematic diagram illustrating a tunable bi-directional transceiver according to an embodiment of the present invention.

FIG. 1 is a simplified schematic diagram illustrating a tunable bi-directional transceiver 100 according to an embodiment of the present invention. The tunable bi-directional transceiver can also be referred to as a tunable optical network architecture or tunable optical network unit. As illustrated in FIG. 1, a transmit/receive port 110 is provided and can be optically coupled to a fiber optic element. Transmit and receive functionality is represented by arrows 105 in optical waveguide 107, which couples transmit/receive port 110 to the full band tunable drop filter 120 discussed below as well as other optical components in the system. As described more fully below, receive functionality is implemented at wavelengths above ~1500 nm and transmit functionality is implemented at wavelengths of ~1310 nm. Receive functionality is referred to as the downstream path and transmit functionality is referred to as the upstream path herein.

The tunable bi-directional transceiver 100 includes a full band tunable drop filter 120 (also referred to as a first filter) operating at wavelengths greater than ~1550 nm. This tunable filter provides a passband channel selection function as described in additional detail in relation to FIG. 3. Received signals at a desired wavelength are selected as the full band tunable drop filter 120 is tuned, enabling selection of a predetermined channel for delivery to receiver 125, which is illustrated as an avalanche photodiode (APD). The wavelength range over which the full band tunable drop filter 120 operates is a predetermined range that can be fixed or variable. Typically, the wavelength range is selected to provide a bandwidth suitable for selection of a predetermined channel in the downstream path. The center wavelength associated with the full band tunable drop filter 120 is tunable over the entire range of the band containing the plurality of predetermined channels. In some implementations, the full band tunable drop filter 120 is implemented as a ring filter, utilizing a set of coupled ring waveguides (e.g., silicon waveguides) that are tunable through current injection, carrier depletion, heating to provide a thermal effect, or the like. Thus, integration of diodes in conjunction with the ring structure can be used to provide the tuning effect described herein as well as channel selection functionality.

Referring once again to FIG. 1, received signals not dropped by the full band tunable drop filter 120 will be filtered by the 1550 nm low pass filter 130, which blocks wavelengths greater than 1550 nm (i.e., the remaining channels in the 1550 nm 10G PON band). As a result, received signals propagating to the right of the 1550 nm low pass filter 130 will be at wavelengths less than 1550 nm. In other words, the 1550 nm low pass filter blocks non-selected 1550 nm band channels from reaching receiver 145 as described more fully below. The 1550 nm low pass filter 130 is optional in some embodiments, for example, depending on the 1500 nm out-of-band rejection performance of other components in the system. One of ordinary skill in the art would recognize many variations, modifications, and alternatives.

The tunable bi-directional transceiver 100 also includes a 1500 nm coupler 140, which may be a vertical grating coupler. The 1500 nm coupler 140 (also referred to as a second filter) selects out the signal (e.g., a video signal) at 1500 nm and delivers this signal to receiver 145, illustrated as an avalanche photodiode (APD). Although APD-based receivers are illustrated herein, the present invention is not limited to these particular types of receivers and other suitable receivers can be utilized, including PIN diodes, balanced phodiodes, and the like. Receiver 145 is thus used in conjunction with the 1500 nm signal. Additional description related to vertical grating couplers, also referred to as sidewall modulated waveguides, is provided in U.S. patent application Ser. No. 13/608,920, filed on Sep. 10, 2012, the disclosure of which is hereby incorporated by reference in its entirety for all purposes. As described therein, adjacent waveguides that include sidewall modulation support contra-directional coupling between the waveguides, producing a reflection profile as a function of wavelength.

Thus, the full band tunable drop filter 120 in conjunction with receiver 125 provides a tunable receiver that covers the 1550 nm band and the 1550 low pass filter 130 and the 1500 nm coupler 140 in conjunction with receiver 145 provide a fixed receiver at the 1500 nm band. Although these particular wavelength signals are described herein for purposes of illustration, the present invention is not limited to this particular wavelength plan and other suitable operating wavelengths can be utilized by embodiments of the present invention.

Transmitter 150, illustrated as a distributed feedback (DFB) laser provides a signal for transmission to the network. In this exemplary embodiment, the transmitter 150 operates at 1310 nm, passing through the 1500 nm coupler 140 and the 1550 low pass filter 130 with negligible loss, enabling transmission through transmit/receive port 110 to the network. The system design enables transmission from the transceiver with receivers 125 and 145 being isolated from and insensitive to the transmitted signals at 1310 nm.

The tunable bi-directional transceiver 100 also includes laser driver 160, control electronics and microprocessor 162, and transimpedance amplifiers (TIAs) 164 as appropriate to the optical communications applications associated with the transceiver. In some embodiments, these elements are implemented using CMOS processing that is compatible with the TAB process for device integration. One of ordinary skill in the art would recognize many variations, modifications, and alternatives.

The integration of the various system components in an integrated opto-electronic package provide benefits not available using conventional techniques utilizing non-integrated discreet components. The integration is implemented in some embodiments by use of a template assisted bonding (TAB) process as discussed in additional detail in commonly assigned U.S. Pat. No. 8,222,084, issued on Jul. 17, 2012, the disclosure of which is hereby incorporated by reference in its entirety for all purposes. Using the TAB process, optically active elements such as lasers can be integrated with other optical elements including receivers on a silicon-based substrate including silicon-based waveguides, filters, and control electronics. Accordingly, integration with CMOS processing and devices enables device integration that is not available using conventional approaches and functionality that is not available using discreet, non-integrated components. In some implementations, integration into an integrated opto-electronics package provides a system that it is not possible to fabricate using conventional techniques. For example, the ring-based tunable filter 120 is implemented in an integrated opto-electronics package. Moreover, the coupler 140, when implemented as a vertical grating structure is implemented in an integrated opto-electronics package.

Referring once again to FIG. 1, the transceiver can provide the following functionality. In a receive path, a data stream (optical data) comprising all the received optical channels (shown in the diagram as a 1500 nm fixed channel and a 1550 nm "band" of multiple channels, enters the transceiver and is coupled to the optical waveguide. In a particular embodiment, this waveguide is defined in silicon, but it may also be defined in other materials. The received light then enters a tunable receiver, which is tuned thermally, or by other methods such as electrostatically, to select one of the 1550 nm channels of interest. One embodiment of the drop filter could be a multiple ring resonator based filter. This light from the "dropped" channel then is converted into an electrical signal by a photoreceiver, also referred to as detector or receiver 125.

The remaining optical signals not "dropped" propagate along the waveguide and are incident on an optional 1550 nm low pass filter, which blocks wavelengths in the 1550 nm band—thus only the 1500 nm channel is left propagating in the illustrated example. The 1500 nm photoreceiver is connected to the waveguide via a drop filter, which in one embodiment may be a vertical grating coupler, which selects this wavelength channel only. It should be noted that the 1550 nm low pass filter may be optional depending on the optical characteristics of the 1500 nm coupler.

The light used for transmission is provided by a 1310 nm Distributed Bragg Reflector (DBR) laser or other suitable laser source such as a tunable laser, or Fabry-Perot laser, and is modulated with electrical data that is desired to be transmitted. This laser light passes through the filters mentioned above, and is not intentionally attenuated by these filters in some implementations. The light is then transmitted back into the PON network. This transmit laser may also be made tunable, as noted above. Note that in addition to direct modulation, the laser may also be coupled to an external modulator for data transmission instead.

In addition to the receive and transmit functions, the transceiver also includes control electronics, amplifiers, laser drivers, and/or software necessary for controlling the device. These may or may not be implemented on the same substrate as the optical devices. One of ordinary skill in the art would recognize many variations, modifications, and alternatives.

FIG. 2 is a simplified spectral diagram illustrating input wavelength bands according to an embodiment of the present invention. Referring to FIG. 2, the input wavelength bands include a first band 210 suitable for video data at ~1500 nm. Although video data at a wavelength of ~1500 nm is illustrated in FIG. 2, this particular type of data and the exact wavelength are not required by the present invention and other types of data are included within the scope of the present invention. Additionally, wavelengths other than 1500 nm can be utilized as appropriate to the particular application.

A second band 220 is also illustrated in FIG. 2 as band suitable for use in a 10-Gbps passive optical network (10G PON). In FIG. 2, the second band is illustrated at wavelengths starting ~1550 nm and extending to ~1600 nm. Although this example is directed at 1550 nm 10G PON systems, the present invention has wider applicability to other optical network standards.

FIG. 3 is a simplified spectral diagram illustrating filtering of tunable receiver wavelength bands according to an embodiment of the present invention. As illustrated in FIG. 1, the full band tunable drop filter 120 provide a tunable channel selection function illustrated by the passband 310. Since the full band tunable drop filter 120 is tunable across the whole range of channels illustrated by the 1550 nm 10G PON band, any of the plurality of channels can be selected for delivery to the appropriate receiver. Although the 1550 nm 10G PON band is illustrated as a continuous wavelength range, one of skill in the art will appreciate that discrete channels are provided in the band. These discrete channels can be selected using the tunable filter as illustrated, which is tunable over the entire range of the band and, therefore, can be used to select the desired channel. In some implementations, a single channel is selected although this is not required by the present invention. As an example, the bandwidth of the tunable drop filter 120 is dependent on the channel spacing and ranges from about 25 GHz to about 75 GHz. In other implementations, multiple channels are selected and passed to the receiver, which can perform an additional selection mechanism to detect the individual channels. One of ordinary skill in the art would recognize many variations, modifications, and alternatives.

FIG. 4 is a simplified spectral diagram illustrating filtering of fixed receiver wavelength bands according to an embodiment of the present invention. As illustrated in FIG. 4, the 1550 nm low pass filter 130 shown in FIG. 1 blocks wavelengths greater than 1550 nm as illustrated by low pass filter 420. As discussed in relation to FIG. 1, the remaining channels in the 1550 nm 10G PON band will be filtered out as illustrated by empty band 425. In some implementations, the 1550 nm low pass filter 130 reduces the amplitude of the signals at wavelengths greater than 1550 nm by dissipating the signals. In other implementations, the low pass filter 130 reflects these signals back into the network through transmit/receive port 110. Additionally, combinations of dissipation and reflection can be implemented as will be evident to one of skill in the art. In addition to the low pass filter 420, FIG. 4 illustrates a 1500 nm filter band 430 associated with 1500 nm coupler 140 illustrated in FIG. 1.

FIG. 5 is a simplified spectral diagram illustrating output wavelength bands according to an embodiment of the present invention. As illustrated in FIG. 5, transmitted light at 1310 nm is generated using transmitter 150 shown in FIG. 1 and transmitted as the upstream signal. Although transmission at a fixed wavelength of 1310 nm is illustrated, the present invention is not limited to this implementation and other wavelengths, including tunable transmission systems are included within the scope of the present invention. Thus, both the transmit and receive bands can be modified in wavelength and bandwidth as appropriate to the particular application. One of ordinary skill in the art would recognize many variations, modifications, and alternatives.

Figure 6:
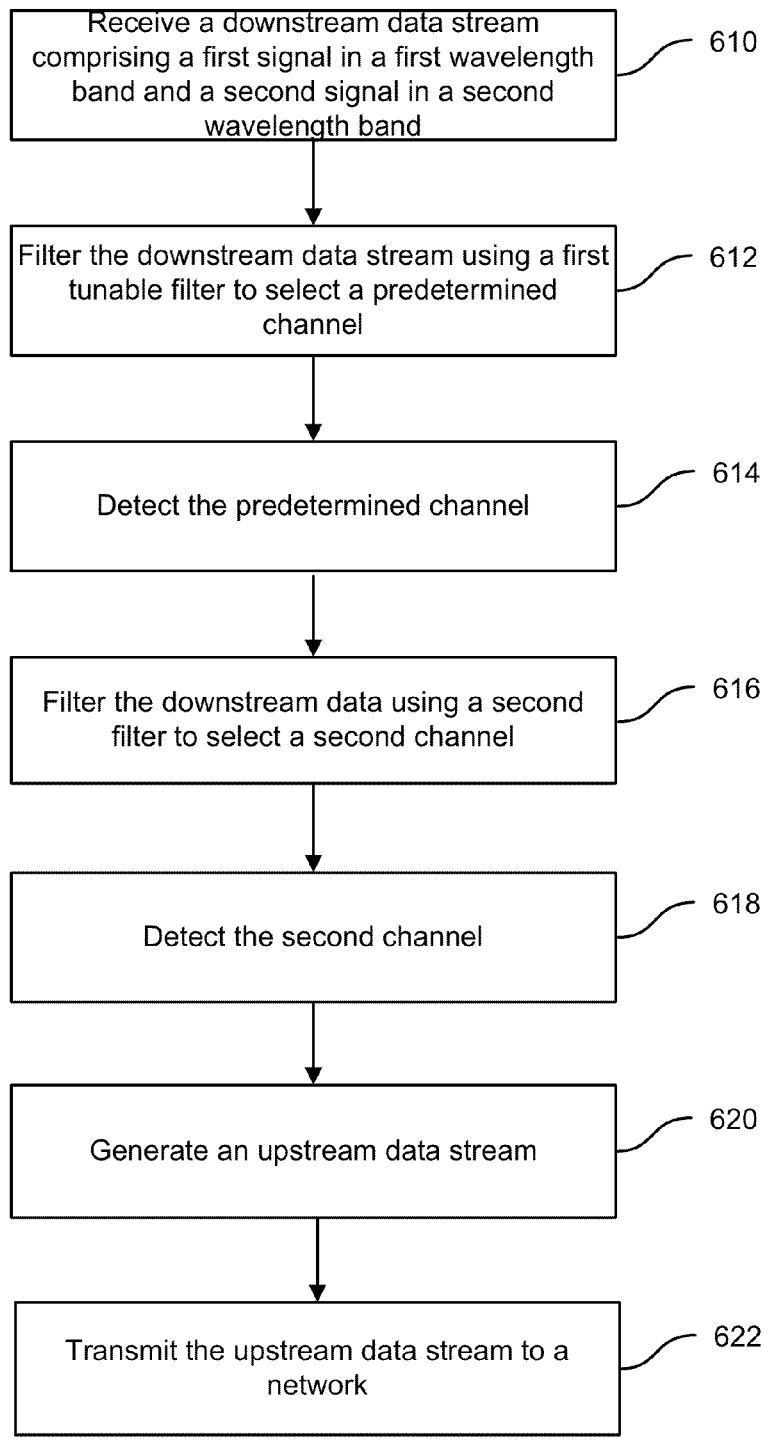
FIG. 6 is a simplified flowchart illustrating a method of operating a transceiver according to an embodiment of the present invention.

FIG. 6 is a simplified flowchart illustrating a method of operating a transceiver according to an embodiment of the present invention. The method includes receiving a downstream data stream comprising a first signal in a first wavelength band and a second signal in a second wavelength band (610). The method also includes filtering the downstream data stream using a first tunable filter to select a predetermined channel (612) and detecting the predetermined channel (614). In an embodiment, the first tunable filter comprises a ring-based drop filter, for example, a sidewall modulated grating structure. In one implementation, the predetermined channel is in a 1550 nm band.

Additionally, the method includes filtering the downstream data using a second filter to select a second channel (616) and detecting the second channel (618). The method further includes generating an upstream data stream (620) and transmitting the upstream data stream to a network (622). The second filter can be a fixed wavelength filter, for example at ~1500 nm. In some implementations, the upstream data stream is generated as a 1310 nm signal and propagates upstream through the transceiver with negligible attenuation since the filters are operable at wavelengths greater than 1500 nm. The method may also include filtering the downstream data using a low pass filter before filtering the downstream data using the second filter.

It should be appreciated that the specific steps illustrated in FIG. 6 provide a particular method of operating a transceiver according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A tunable bi-directional transceiver comprising:
an optical waveguide, defined in silicon and integrated on a chip;
a first filter, defined in silicon and integrated on the chip, optically coupled to the optical waveguide and operable to filter a first optical signal in a first wavelength band propagating downstream in the optical waveguide, wherein a center wavelength of the first wavelength band is tunable;
a first receiver, integrated on the chip, optically coupled to the first filter to receive the first optical signal;
a second filter, defined in silicon and integrated on the chip, optically coupled to the optical waveguide and operable to filter a second optical signal in a second wavelength band propagating downstream in the optical waveguide, wherein the second wavelength band is different from the first wavelength band;
a second receiver, integrated on the chip, optically coupled to the second filter to receive the second optical signal; and
a laser, integrated on the, optically coupled to the optical waveguide and operable to output radiation in a third wavelength band propagating upstream in the optical waveguide, wherein:
the laser is integrated on the chip using template assisted bonding to integrate a direct-energy bandgap material on the chip;
the third wavelength band is different from both the first wavelength band and the second wavelength band.

2. The tunable bi-directional transceiver of claim 1 wherein a center frequency of the second wavelength band is tunable.

3. The tunable bi-directional transceiver of claim 1 further comprising a low pass filter disposed between the first filter and the second filter, wherein the low pass filter blocks light in the first wavelength band from propagating downstream of the low pass filter.

4. The tunable bi-directional transceiver of claim 1 wherein the third wavelength band is tunable.

5. The tunable bi-directional transceiver of claim 1 further comprising one or more additional filters.

6. The tunable bi-directional transceiver of claim 1 further comprising one or more additional receivers.

7. The tunable bi-directional transceiver of claim 1 further comprising one or more additional lasers.

8. The tunable bi-directional transceiver of claim 1 wherein the chip comprises a silicon-based substrate.

9. The tunable bi-directional transceiver of claim 1 further comprising control electronics implemented on the chip using CMOS-compatable processing.

10. A method of operating a transceiver, the method comprising:
receiving a downstream data stream with a waveguide defined in silicon and integrated on a chip comprising a first signal in a first wavelength band and a second signal in a second wavelength band;
filtering the downstream data stream using a first tunable filter, defined in silicon and integrated on the chip, to select a predetermined channel;
detecting, using a first receiver integrated on the chip, the predetermined channel;
filtering the downstream data using a second filter, defined in silicon and integrated on the chip, to select a second channel;
detecting the second channel, using a second receiver integrated on the chip;
generating an upstream data stream; and
transmitting, using a transmitter integrated on the chip, the upstream data stream to a network, wherein the transmitter is integrated on the chip using template assisted bonding to integrate a direct-energy bandgap material on the chip.

11. The method of claim 10 wherein the first tunable filter comprises a ring-based drop filter.

12. The method of claim 10 wherein the predetermined channel is in a 1550 nm band.

13. The method of claim 10 wherein the second filter comprises a fixed wavelength filter.

14. The method of claim 10 wherein generating the upstream data stream comprises generating a 1310 nm signal.

15. The method of claim 10 further comprising filtering the downstream data using a low pass filter before filtering the downstream data using the second filter.

16. The method of claim 10 wherein the chip comprises a silicon-based substrate.

* * * * *